March 28, 1950  E. L. BALLARD  2,502,243
PULLEY
Filed Dec. 20, 1945

E. L. Ballard
INVENTOR.

BY *CA Snowles*
ATTORNEYS.

Patented Mar. 28, 1950

2,502,243

UNITED STATES PATENT OFFICE 2,502,243

PULLEY

Edwin L. Ballard, Lansing, Mich.

Application December 20, 1945, Serial No. 636,085

1 Claim. (Cl. 74—230.17)

This invention relates to pulley construction, the primary object of the invention being to provide a sectional pulley wherein the sections may be adjusted with respect to each other to compensate for wear and slack of the belt operating thereover.

A further object of the invention is to provide a sectional pulley wherein the sections may be readily and easily disconnected to permit the position or removal of the pulley without unduly stretching the belt operating thereover.

Another object of the invention is the provision of a sectional pulley wherein the main section may be secured to a shaft and the remaining section positioned thereover, guarding the securing screw of the pulley, against damaging the belt operating over the pulley.

Still another object of the invention is to provide means other than the threaded connection between the sections of the pulley, for securing the sections against rotation with respect to each other.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing.

Figure 1:
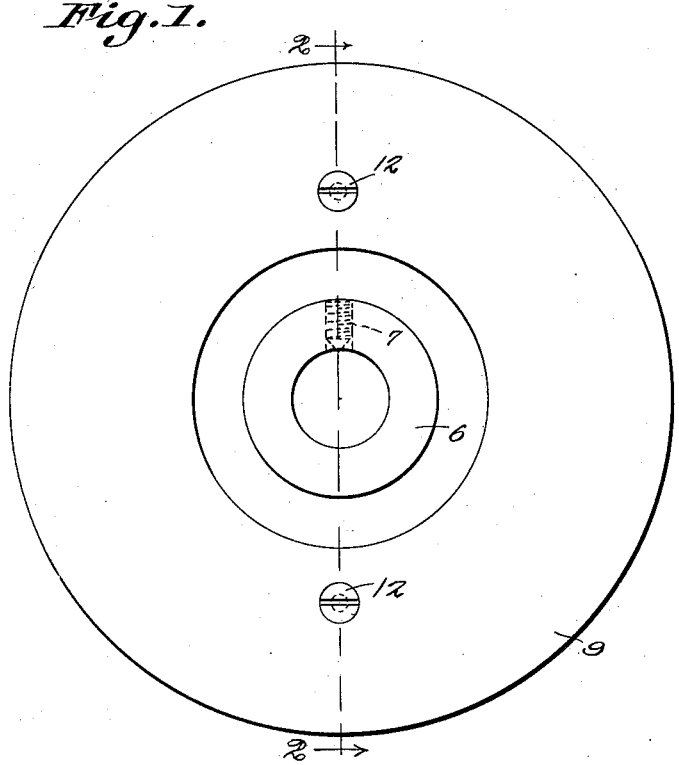
Figure 1 is a side elevational view of a pulley constructed in accordance with the invention.

Referring to the drawing in detail, the pulley comprises a main section 5 which is formed with the hub 6 that has a threaded opening extended at an acute angle with respect to the wall of the hub, for the reception of the screw 7, which is pointed to bite into the shaft on which the pulley is positioned, thereby to secure the pulley against rotation with respect to the shaft.

Figure 2:
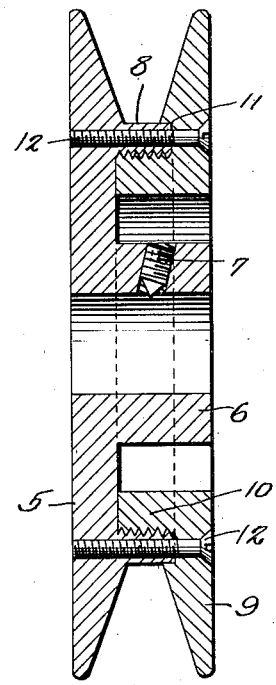
Figure 2 is a sectional view taken on line 2—2 of Figure 1.
Figure 3:
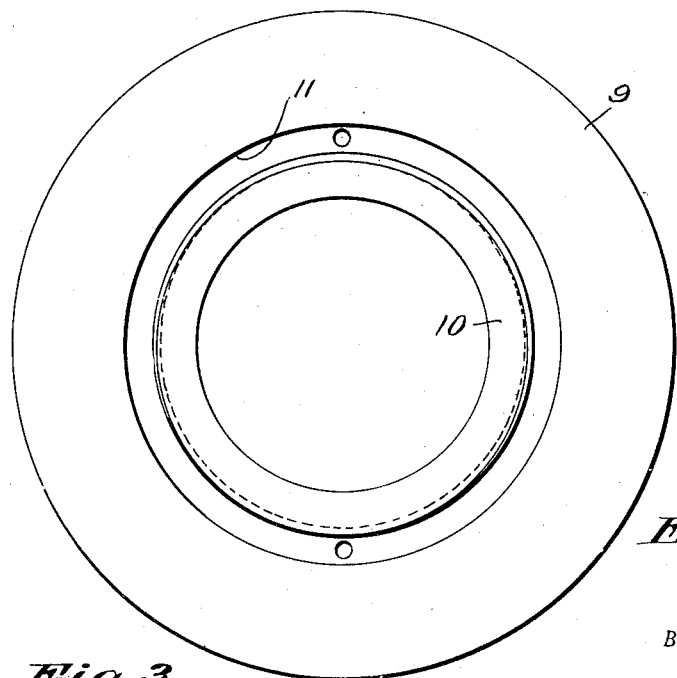
Figure 3 is an elevational view illustrating the inner surface of one section of the pulley.

The main section is provided with an annular flange 8, which is spaced from the periphery of the main section, the inner surface of the flange being threaded, as clearly shown by Figure 2 of the drawing.

The pulley also includes the cooperating section 9 which is formed with an annular flange 10 that has external threads formed thereon, the threads of the flanges cooperating in securing the sections of the pulley together.

The section 9 of the pulley is formed with an annular groove 11, which is of a width to accommodate the free edge of the annular flange 8, so that a smooth belt engaging surface is provided between the sections to insure against sharp edges cutting the belt.

Aligning openings are also provided in the sections of the pulley, and these aligning openings are designed to receive the screws 12 which securely lock the sections of the pulley against rotation, with respect to each other under the strain directed to the pulley, by a belt moving thereover.

From the foregoing it will be seen that due to the construction shown and described, I have provided a pulley wherein one section thereof may be removed and a belt positioned on the pulley, the removed sections then being replaced and secured in a manner as described.

It will also be seen that due to this construction, removal of the belt operating over the pulley may be facilitated.

What is claimed is:

In a pulley, a main pulley section, a hub extending from the main pulley section, an annular internally threaded flange formed on the main section concentric with the hub, said hub having a threaded opening, a securing screw positioned in the opening securing the main pulley section to a pulley shaft, a second pulley section, an annular externally threaded flange extending from the second pulley section cooperating with the threads of the flange of the main pulley section in connecting the sections, the flange of the second pulley section being spaced from the hub of the main section when the sections are connected, providing a clearance between the sections for access to said securing screw, and screws extending through the second pulley section and passing through the annular flange of the main pulley section, securing the sections against movement with respect to each other.

EDWIN L. BALLARD.

REFERENCES CITED

The following references are of record in the file of this patent:

UNITED STATES PATENTS

| Number | Name | Date |
|---|---|---|
| 237,910 | Ryno | Feb. 15, 1881 |
| 1,598,425 | Dailey | Aug. 31, 1926 |
| 1,952,884 | Nichols | Mar. 27, 1934 |

FOREIGN PATENTS

| Number | Country | Date |
|---|---|---|
| 478 | Great Britain | 1905 |
| 214,642 | Germany | Oct. 14, 1909 |